(12) United States Patent
Sunahara et al.

(10) Patent No.: US 11,173,884 B2
(45) Date of Patent: Nov. 16, 2021

(54) VEHICLE BEHAVIOR CONTROL DEVICE

(71) Applicant: MAZDA MOTOR CORPORATION, Hiroshima (JP)

(72) Inventors: Osamu Sunahara, Hiroshima (JP); Daisuke Umetsu, Hiroshima (JP); Yasunori Takahara, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 402 days.

(21) Appl. No.: 16/208,334

(22) Filed: Dec. 3, 2018

(65) Prior Publication Data

US 2019/0193694 A1 Jun. 27, 2019

(30) Foreign Application Priority Data

Dec. 27, 2017 (JP) .............................. JP2017-250454

(51) Int. Cl.
*B60T 8/1755* (2006.01)
*B60T 8/1764* (2006.01)
*B60W 10/184* (2012.01)

(52) U.S. Cl.
CPC .......... *B60T 8/1755* (2013.01); *B60T 8/1764* (2013.01); *B60T 8/17555* (2013.01);
(Continued)

(58) Field of Classification Search
None
See application file for complete search history.

(56) References Cited

U.S. PATENT DOCUMENTS 5,229,944 A * 7/1993 Yasuno ................. B60T 8/1755
303/146
5,344,224 A * 9/1994 Yasuno ................... B60T 8/172
303/146
(Continued)

FOREIGN PATENT DOCUMENTS

DE 103 25 486 A1 1/2004
DE 10 2016 013 126 A1 5/2017
(Continued)

OTHER PUBLICATIONS

The extended European search report issued by the European Patent Office dated Jun. 13, 2019, which corresponds to European Patent Application No. 18210309.3-1012 and is related to U.S. Appl. No. 16/208,334.

*Primary Examiner* — Thomas E Worden
(74) *Attorney, Agent, or Firm* — Studebaker & Brackett PC

(57) ABSTRACT

The vehicle behavior control device comprises a brake control system (18) capable of applying different braking forces, respectively, to right and left road wheels of a vehicle (1). The vehicle behavior control device further comprises: a steering angle sensor (8); a vehicle speed sensor (10); a yaw rate sensor (12); and a yaw moment setting part (22) in PCM (14) configured to decide a target yaw rate of the vehicle based on a steering angle and a vehicle speed, and set, based on a change rate of a difference between an actual yaw rate and the target yaw rate, a yaw moment oriented in a direction opposite to that of the actual yaw rate of the vehicle, as a target yaw moment, whereby the brake control system can regulate the braking forces of the road wheels so as to apply the target yaw moment to the vehicle.

10 Claims, 6 Drawing Sheets

(52) U.S. Cl.
CPC ........ B60W 10/184 (2013.01); *B60T 2201/16* (2013.01); *B60T 2220/03* (2013.01); *B60T 2230/04* (2013.01); *B60T 2250/03* (2013.01); *B60T 2250/04* (2013.01); *B60T 2260/024* (2013.01)

(56) References Cited

U.S. PATENT DOCUMENTS

| | | | | |
|---|---|---|---|---|
| 5,816,669 | A * | 10/1998 | Hiwatashi | B62D 7/159 303/140 |
| 5,915,800 | A * | 6/1999 | Hiwatashi | B60T 8/1755 303/146 |
| 10,933,875 | B2 * | 3/2021 | Suzuki | B62D 15/021 |
| 2004/0016594 | A1 * | 1/2004 | Yasui | B60W 40/101 180/446 |
| 2004/0019417 | A1 * | 1/2004 | Yasui | B60W 40/101 701/36 |
| 2004/0098186 | A1 * | 5/2004 | Watanabe | B60T 8/56 701/72 |
| 2004/0133324 | A1 * | 7/2004 | Yasui | B62D 6/04 701/41 |
| 2004/0148077 | A1 * | 7/2004 | Yasui | B60T 8/1755 701/41 |
| 2006/0086543 | A1 * | 4/2006 | Motoyama | B60W 10/184 180/6.32 |
| 2006/0091727 | A1 * | 5/2006 | Motoyama | B60K 31/0066 303/189 |
| 2013/0062930 | A1 * | 3/2013 | Muntu | B60T 8/1766 303/3 |
| 2015/0120121 | A1 * | 4/2015 | Nobumoto | B60L 7/14 701/22 |
| 2015/0314803 | A1 * | 11/2015 | Kojo | B62D 5/049 701/43 |
| 2017/0129481 | A1 * | 5/2017 | Umetsu | B60W 30/02 |
| 2017/0254281 | A1 * | 9/2017 | Ohisa | F02D 9/02 |
| 2018/0304768 | A1 * | 10/2018 | Suzuki | B60L 9/18 |
| 2019/0084570 | A1 * | 3/2019 | Suzuki | B60W 10/184 |
| 2020/0339107 | A1 * | 10/2020 | Ogawa | F02D 29/02 |

FOREIGN PATENT DOCUMENTS

| | | |
|---|---|---|
| JP | 2010-162911 A | 7/2010 |
| JP | 2012-001077 A | 1/2012 |
| JP | 2017-155676 A | 9/2017 |
| WO | 2011/073415 A1 | 6/2011 |

* cited by examiner

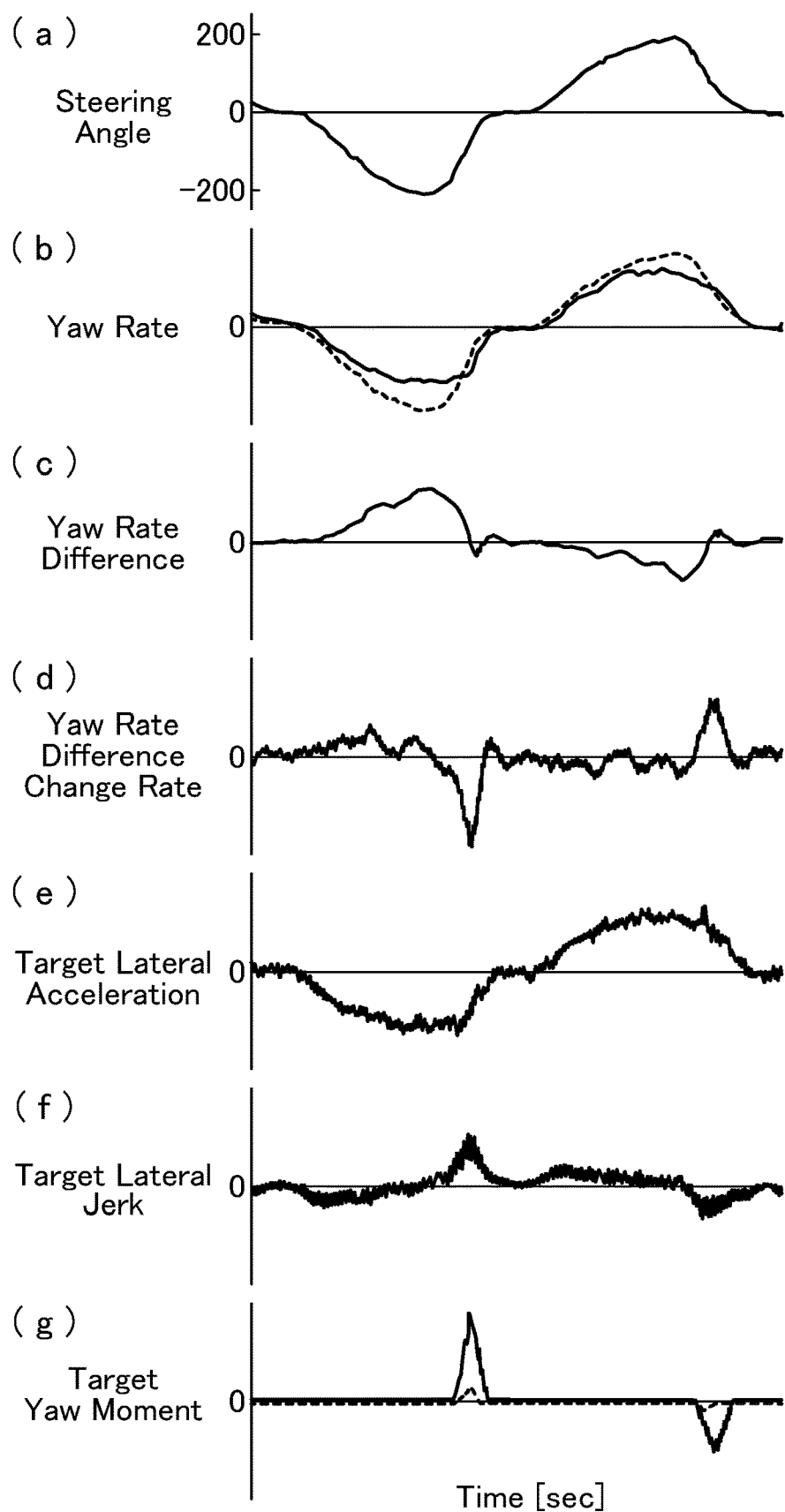

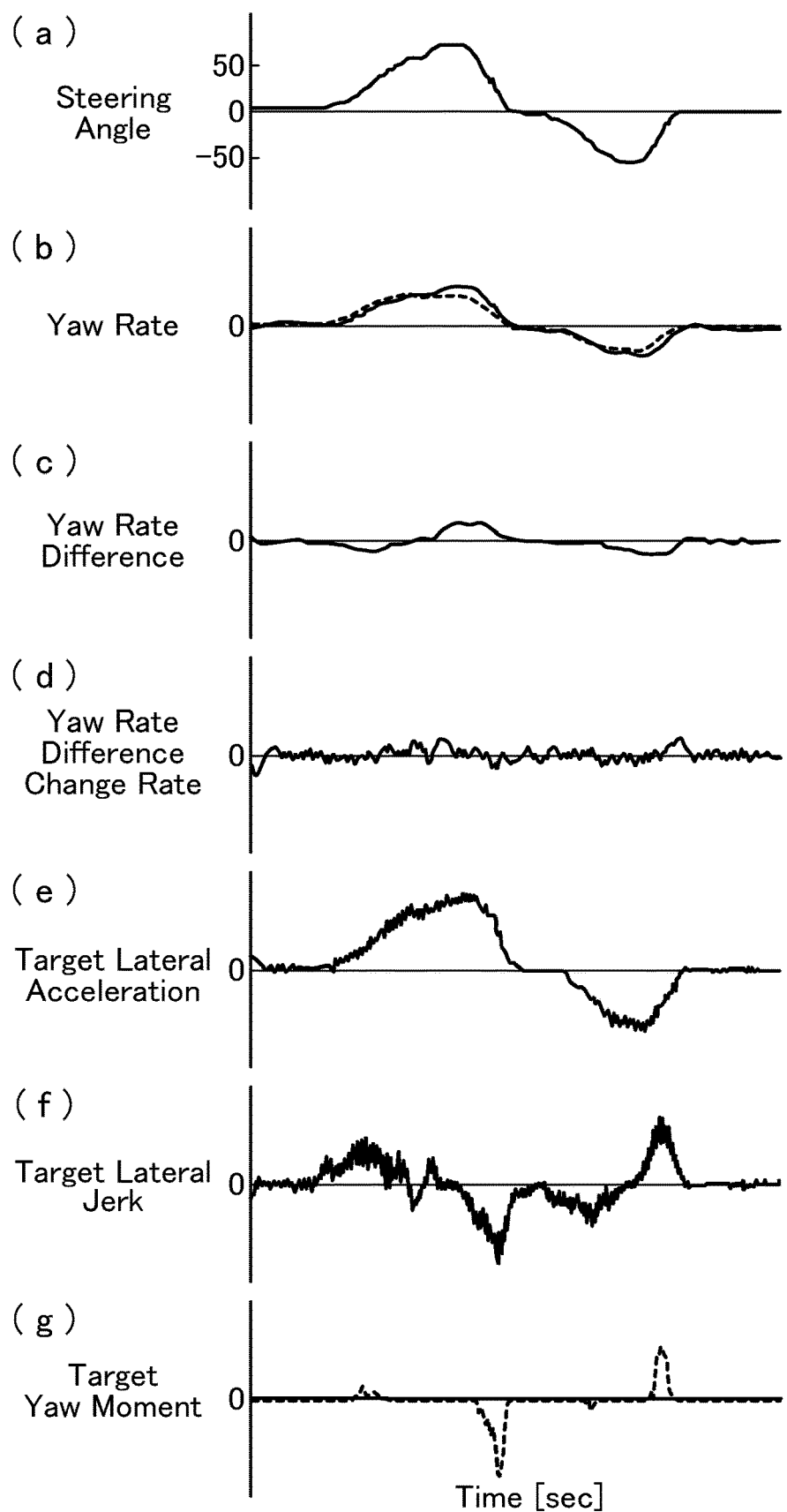

VEHICLE BEHAVIOR CONTROL DEVICE

BACKGROUND OF THE INVENTION

Field of the Invention

The present invention relates to a vehicle behavior control device and more particularly to a vehicle behavior control device comprising a braking device capable of applying different braking forces, respectively, to right and left road wheels of a vehicle.

Description of Related Art

Heretofore, there has been known a control device capable of, in a situation where the behavior of a vehicle becomes unstable due to road wheel slip or the like, controlling the vehicle behavior to enable a safe traveling (e.g., an antiskid brake device). Specifically, there has been known a control device operable to detect the occurrence of understeer or oversteer behavior in the vehicle during vehicle cornering or the like, and apply an appropriate degree of deceleration to one or more road wheels so as to suppress such a behavior.

As a different type of control from the above control for improving safety in a traveling condition causing the vehicle behavior to become unstable, there has been known a vehicle motion control device operable to automatically perform acceleration or deceleration of a vehicle in association with the manipulation of a steering wheel which is started from a usual driving region, to thereby reduce skid in a marginal driving region, (see JP-A-2010-162911 (Patent Document 1), for example).

BRIEF SUMMARY OF THE INVENTION

Technical Problem

However, the conventional antiskid brake device is configured to forcibly control vehicle attitude upon the occurrence of significant understeer or oversteer in the vehicle at a level causing the vehicle behavior to become unstable. Therefore, in a situation before understeer or oversteer becomes significant, the control is not executed, whereas, during execution of the control, a driver will be given a strong feeling of control intervention.

Further, in the conventional motion control device described in the Patent Document 1, control of applying a driving force in a direction causing the vehicle to be accelerated is performed in response to a turning-back manipulation of the steering wheel by a driver. However, a driver tends to perceive vehicle acceleration more easily than vehicle deceleration, so that the driver is given a feeling of strangeness.

The present invention has been made in view of solving the above conventional problems, and an object thereof is to provide a vehicle behavior control device capable of improving responsiveness and linear feeling of the behavior of a vehicle with respect to steering manipulation, and stabilizing the vehicle attitude to enhance a feeling of safety, without giving a driver a strong feeling of control intervention or a feel of strangeness.

Solution to Problem

In order to achieve the above object, the present invention provides a vehicle behavior control device including: a braking device capable of applying different braking forces, respectively, to right and left road wheels of a vehicle; a steering wheel configured to be manipulated by a driver; a steering angle sensor configured to detect a steering angle of the steering wheel; a vehicle speed sensor configured to detect a vehicle speed of the vehicle; a yaw rate sensor configured to detect an actual yaw rate of the vehicle; and a processor configured to control the braking device, wherein the processor is configured to: decide a target yaw rate of the vehicle, based on the steering angle and the vehicle speed; set a yaw moment oriented in a direction opposite to that of the actual yaw rate of the vehicle, as a target yaw moment to be applied to the vehicle, based on a change rate of a difference between the actual yaw rate and the target yaw rate; and control the braking device to apply the target yaw moment to the vehicle.

In the vehicle behavior control device of the present invention having the above feature, the processor is configured to decide a target yaw rate of the vehicle, based on the steering angle and the vehicle speed, and set, based on a change rate of a difference between the actual yaw rate and the target yaw rate, a yaw moment oriented in a direction opposite to that of the actual yaw rate of the vehicle, as a target yaw moment. Thus, for example, when the steering wheel is manipulated on a low-μ road such as a compacted snow road, a yaw moment oriented to suppress turning of the vehicle can be applied to the vehicle immediately in response to a rapid change in the yaw rate difference due to a response delay (lag) of the actual yaw rate, so that it is possible to quickly stabilize the vehicle behavior in response to the steering manipulation by the driver, before the vehicle behavior becomes unstable. This makes it possible to improve responsiveness and linear feeling of the vehicle behavior with respect to the steering manipulation, and stabilize the vehicle attitude to enhance a feeling of safety.

Preferably, in the vehicle behavior control device of the present invention, the processor is configured to set the target yaw moment to a larger value as the change rate of the difference between the actual yaw rate and the target yaw rate becomes larger.

According to this feature, when the change rate of the yaw rate difference between the actual yaw rate and the target yaw rate becomes larger due to a response delay of the vehicle behavior with respect to a rapid steering manipulation, e.g., on a low-μ road such as a compacted snow road, the processor is configured to set the target moment to a larger value. Thus, a yaw moment oriented to suppress turning of the vehicle can be applied to the vehicle more strongly as the response delay of the vehicle behavior with respect to the steering manipulation becomes larger, so that it is possible to quickly stabilize the vehicle behavior in response to the steering manipulation by the driver.

Preferably, in the vehicle behavior control device of the present invention, when the steering angle is decreasing and the change rate of the difference between the actual yaw rate and the target yaw rate is equal to or greater than a given value, the processor is configured to set the target yaw moment.

According to this feature, when a turning-back manipulation of the steering wheel is being performed, and the change rate of the difference between the actual yaw rate and the target yaw rate is equal to or greater than a given value, the processor is configured to set the target yaw moment oriented to suppress turning of the vehicle. Thus, when the yaw rate difference rapidly changes due to a follow-up delay of the vehicle behavior with respect to the turning-back manipulation of the steering wheel, e.g., in a situation where the turning-back manipulation is being performed on a low-μ road such as a compacted snow road, a yaw moment oriented to suppress turning of the vehicle can be applied to the vehicle immediately in response to the rapid change in the yaw rate difference. This makes it possible to quickly stabilize the vehicle behavior in response to the steering manipulation by the driver, before the vehicle behavior becomes unstable.

Preferably, in the vehicle behavior control device of the present invention, when the difference between the actual yaw rate and the target yaw rate is changing in a direction causing the actual yaw rate to become greater than the target yaw rate, the processor is configured to set the target yaw moment.

According to this feature, when the yaw rate difference is changing in a direction causing the vehicle behavior to exhibit oversteer tendency, the processor is configured to set the target yaw moment oriented to suppress turning of the vehicle. Thus, when the yaw rate difference changes in the direction causing the vehicle behavior to exhibit oversteer tendency due to a follow-up delay of the vehicle behavior with respect to the turning-back manipulation of the steering wheel, e.g., in a situation where the turning-back manipulation is being performed on a low-μ road such as a compacted snow road, a yaw moment oriented to suppress turning of the vehicle can be applied to the vehicle immediately in response to the rapid change in the yaw rate difference. This makes it possible to quickly stabilize the vehicle behavior in response to the steering manipulation by the driver, before the vehicle behavior becomes unstable.

Preferably, in the vehicle behavior control device of the present invention, the target yaw moment set based on the change rate of the difference between the actual yaw rate and the target yaw rate is defined as a first target yaw moment, and the processor is configured to: set, when the steering angle is decreasing, a yaw moment oriented in a direction opposite to that of the actual yaw rate of the vehicle, as a second target yaw moment, based on a rate of the decrease in the steering angle; and control the braking device to apply the first target yaw moment or the second target yaw moment to the vehicle.

According to this feature, when the turning-back manipulation of the steering wheel is being performed, the processor is configured to set, based on the rate of the decrease in the steering angle, a yaw moment oriented to suppress turning of the vehicle, as a second target yaw moment. Thus, a yaw moment having a magnitude based on the speed of the turning-back manipulation by the driver can be applied to the vehicle in a direction enabling the yaw moment to suppress turning of the vehicle, so that it is possible to quickly stabilize the vehicle behavior during the turning-back manipulation. This makes it possible to improve the responsiveness and linear feeling of the vehicle behavior with respect to the steering manipulation, and stabilize the vehicle attitude to enhance the feeling of safety.

More preferably, in the above vehicle behavior control device, the processor is configured to control the braking device to apply a larger one of the first target yaw moment and the second target yaw moment to the vehicle.

According to this feature, for example, in a situation where the vehicle is traveling on a low-μ road such as a compacted snow road at a low vehicle speed, and the difference between the actual yaw rate and the target yaw rate is more likely to rapidly change due to the response delay of the vehicle behavior, the first target yaw moment oriented to suppress turning of the vehicle can be applied to the vehicle immediately in response to the rapid change in the yaw rate difference, whereas, for example, in a situation where the vehicle is traveling on a high-μ road such as a dry asphalt road, and the difference between the actual yaw rate and the target yaw rate is less likely to occur, the second target yaw moment oriented to suppress turning of the vehicle can be applied to the vehicle, based on the speed of the turning-back manipulation by the driver. This makes it possible to improve the responsiveness and linear feeling of the vehicle behavior with respect to the steering manipulation and stabilize the vehicle attitude to enhance the feeling of safety, under various traveling conditions.

Preferably, the vehicle behavior control device of the present invention further includes a power source configured to output a torque for driving road wheels of the vehicle, wherein, when the steering angle is increasing, the processor is configured to set an additional deceleration to be added to the vehicle, based on a rate of the increase in the steering angle, and to reduce the output torque of the power source so as to attain the additional deceleration.

According to this feature, when a turning manipulation of the steering wheel, the processor is configured to reduce the output torque of the power source (prime mover) so as to attain the additional deceleration set based on the rate of the increase in the steering angle. Thus, when the turning manipulation is performed, a vertical load on the front road wheels can be increased by reducing the output torque of the power source based on a steering speed during the turning manipulation, to control the vehicle behavior with a good responsiveness with respect to the turning manipulation by the driver. This makes it possible to improve the responsiveness and linear feeling of the vehicle behavior with respect to the steering manipulation, without giving the driver a strong feeling of control intervention.

According to another aspect of the present invention, there is provided a vehicle behavior control device including: a power source configured to output a torque for driving road wheels of a vehicle; a braking device capable of applying different braking forces, respectively, to right and left road wheels of the vehicle; a steering wheel configured to be manipulated by a driver; a steering angle sensor configured to detect a steering angle of the steering wheel; a vehicle speed sensor configured to detect a vehicle speed of the vehicle; a yaw rate sensor configured to detect an actual yaw rate of the vehicle; and a processor configured to control the power source and the braking device, wherein the processor is configured to: set an additional deceleration to be added to the vehicle, to a value of 0.05 G or less, according to a steering speed which is a change rate of the steering angle, or a lateral jerk obtained based on a lateral acceleration of the vehicle, when a turning manipulation of the steering wheel is being performed and the steering angle detected by the steering angle sensor is increasing; reduce the output torque of the power source so as to generate the additional deceleration; decide a target yaw rate of the vehicle based on the steering angle and the vehicle speed, when a turning-back manipulation of the steering wheel is being performed and the steering angle detected by the steering angle sensor is decreasing; set a yaw moment oriented to suppress turning of the vehicle, as a first target yaw moment, based on a change rate of a difference between the actual yaw rate and the target yaw rate; set another yaw moment oriented to suppress turning of the vehicle, as a second target yaw moment, by multiplying the lateral jerk or the steering angle by a given coefficient; and control the braking device to apply a larger one of the first target yaw moment and the second target yaw moment to the vehicle.

The vehicle behavior control device of the present invention can improve responsiveness and linear feeling of the vehicle behavior with respect to the steering manipulation, and stabilize the vehicle attitude to enhance the feeling of safety, without giving a driver a strong feeling of control intervention or a feel of strangeness.

BRIEF DESCRIPTION OF THE SEVERAL VIEWS OF THE DRAWINGS

FIG. 7 depicts time charts indicating temporal changes in various parameters pertaining to behavior control, as measured when the vehicle equipped with the vehicle behavior control device according to this embodiment is driven along a cornering course on a compacted snow road, wherein (a), (b), (c) and (d) are, respectively, a time chart indicating a steering angle, a time chart indicating a target yaw rate and an actual yaw rate, a time chart indicating a difference between the actual yaw rate and the target yaw rate, and a time chart indicating a change rate of the difference between the actual yaw rate and the target yaw rate, and (e), (f) and (g) are, respectively, a time chart indicating a target lateral acceleration, a time chart indicating a target lateral jerk, and a time chart indicating a target yaw moment.

FIG. 8 depicts time charts indicating temporal changes in various parameters pertaining to behavior control, as measured when the vehicle equipped with the vehicle behavior control device according to this embodiment is driven along a cornering course on a dry asphalt road, wherein (a), (b), (c) and (d) are, respectively, a time chart indicating the steering angle, a time chart indicating the target yaw rate and the actual yaw rate, a time chart indicating the difference between the actual yaw rate and the target yaw rate, and a time chart indicating the change rate of the difference between the actual yaw rate and the target yaw rate, and (e), (f) and (g) are, respectively, a time chart indicating the target lateral acceleration, a time chart indicating the target lateral jerk, and a time chart indicating the target yaw moment.

DETAILED DESCRIPTION OF THE INVENTION

With reference to the accompanying drawings, a vehicle behavior control device according to one embodiment of the present invention will now be described.

Figure 1:
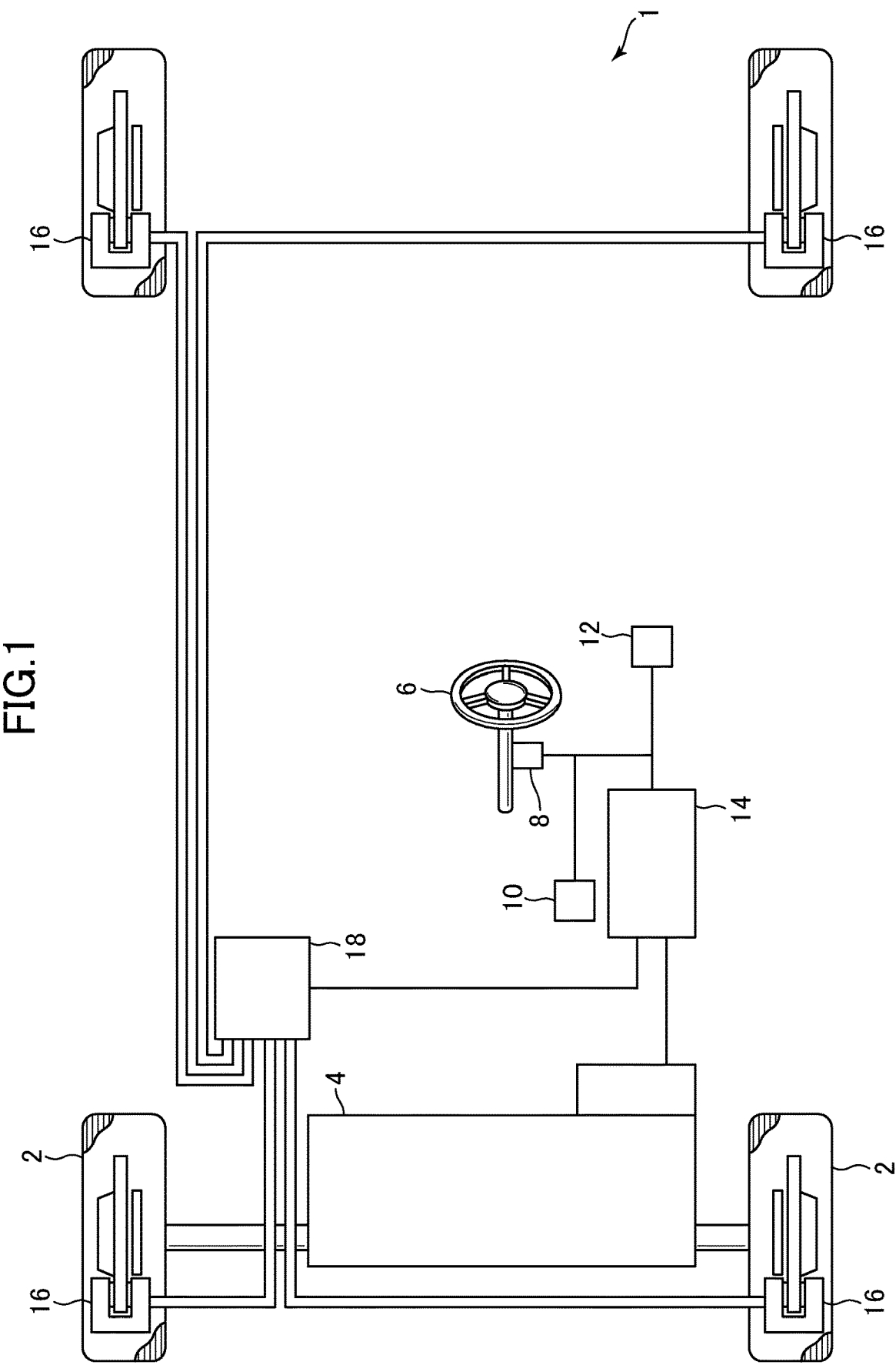
FIG. 1 is a block diagram depicting an overall configuration of a vehicle equipped with a vehicle behavior control device according to one embodiment of the present invention.

First of all, a vehicle equipped with the vehicle behavior control device according to this embodiment will be described based on FIG. 1. FIG. 1 is a block diagram depicting an overall configuration of the vehicle equipped with the vehicle behavior control device according to this embodiment.

In FIG. 1, the reference sign 1 indicates the vehicle equipped with the vehicle behavior control device according to this embodiment. The vehicle 1 has a vehicle body with a front portion to which a drive control system 4 for driving drive road wheels 2 (in the embodiment depicted in FIG. 1, a pair of right and left front road wheels among four road wheels) is mounted. As the drive control system 4, it is possible to use an internal combustion engine such as a gasoline engine or a diesel engine, and an electric motor. The drive control system 4 functions as "power source" set forth in the appended claims, although details thereof will be described later.

The vehicle 1 is further equipped with: a steering angle sensor 8 for detecting a rotational angle of a steering shaft (not depicted) coupled to a steering wheel 6 (steering angle); a vehicle speed sensor 10 for detecting a vehicle speed; and a yaw rate sensor 12 for detecting a yaw rate. Each of these sensors is operable to output a detection value thereof to a PCM 14 (Power-train Control Module).

The vehicle 1 is further equipped with a brake control system 18 for supplying a brake fluid pressure to a wheel cylinder or a brake caliper of a brake unit (braking device) 16 installed in each of the four road wheels. The brake control system 18 is operable, based on a yaw moment command (corresponding to an aftermentioned target yaw moment) input from the PCM 14, to calculate fluid pressures to be supplied, respectively and independently, to the wheel cylinders or brake calipers in the respective road wheels, and control brake pumps according to the calculated fluid pressures.

Figure 2:
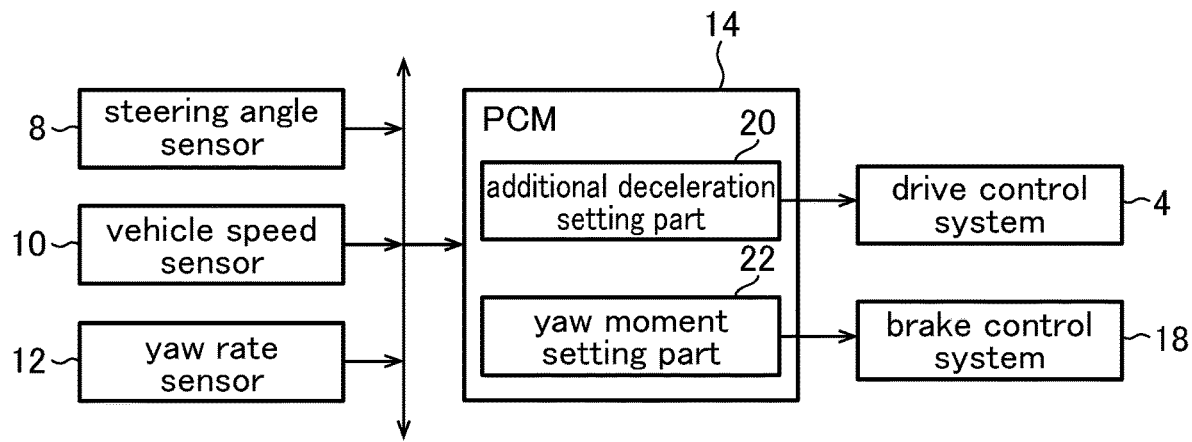
FIG. 2 is a block diagram depicting an electrical configuration of the vehicle behavior control device according to this embodiment.

Next, with reference to FIG. 2, an electrical configuration of the vehicle behavior control device according to this embodiment will be described. FIG. 2 is a block diagram depicting the electrical configuration of the vehicle behavior control device according to this embodiment.

The PCM 14 is operable, based on the detection signals from the aforementioned sensors, and detection signals output from various sensors for detecting an operating state of the drive control system 4, to output control signals in order to perform control with respect to various sections (such as a throttle valve, a turbocharger, a variable valve mechanism, an ignition device, a fuel injection valve, an EGR device, and an inverter) of the drive control system 4.

The PCM 14 comprises an additional deceleration setting part 20 for setting an additional deceleration to be added to the vehicle 1 in association with a change in the steering angle, and a yaw moment setting part 22 for setting a target yaw moment to be applied to the vehicle 1 in association with a change in the steering angle.

These elements of the PCM 14 are composed of a computer which comprises: one or more processors; various programs (including a basic control program such as an OS, and an application program capable of being activated on the OS to realize a specific function) to be interpreted and executed by the one or more processors; and an internal memory such as ROM or RAM for storing therein the programs and a variety of data.

Next, with reference to FIGS. 3 to 6, a processing routine to be executed by the vehicle behavior control device will be described.

Figure 3:
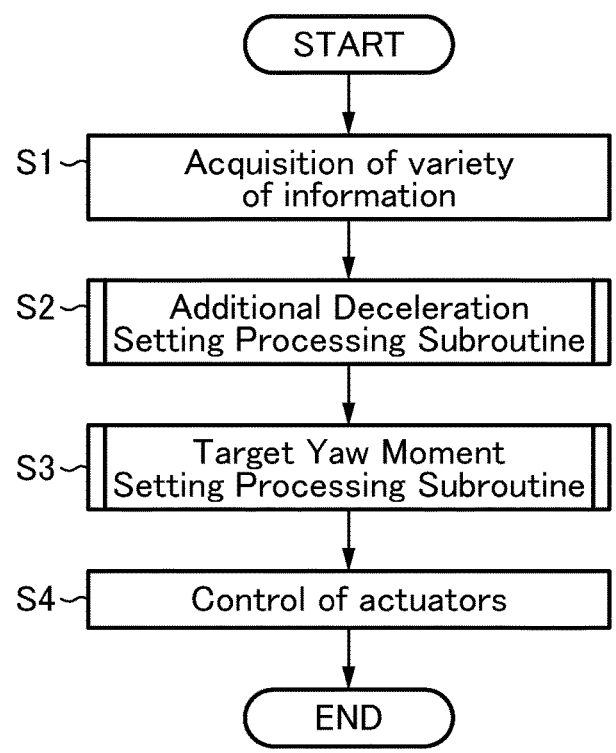
FIG. 3 is a flowchart of a behavior control processing routine to be executed by the vehicle behavior control device according to this embodiment.
Figure 4:
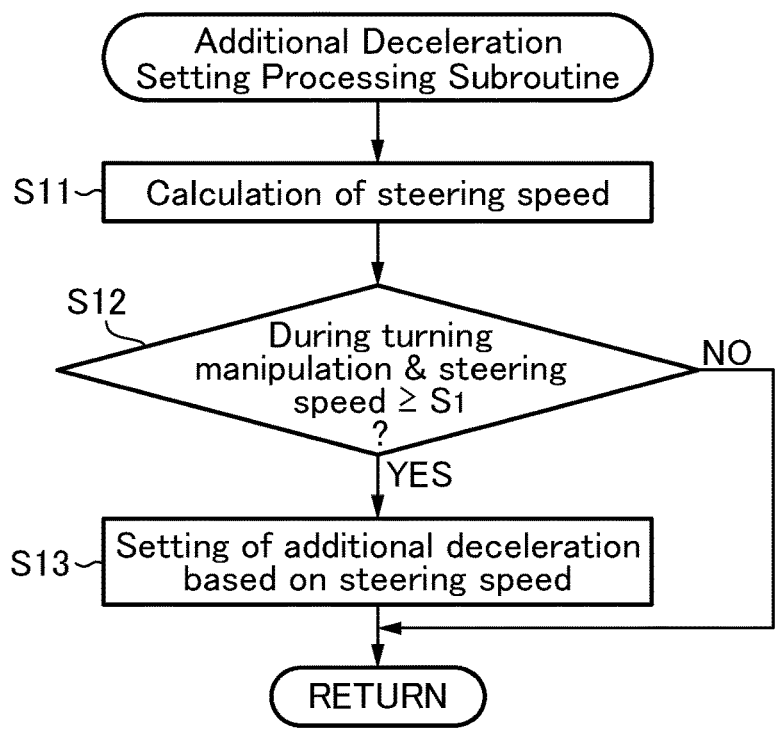
FIG. 4 is a flowchart of an additional deceleration setting processing subroutine through which the vehicle behavior control device according to this embodiment sets an additional deceleration.
Figure 5:
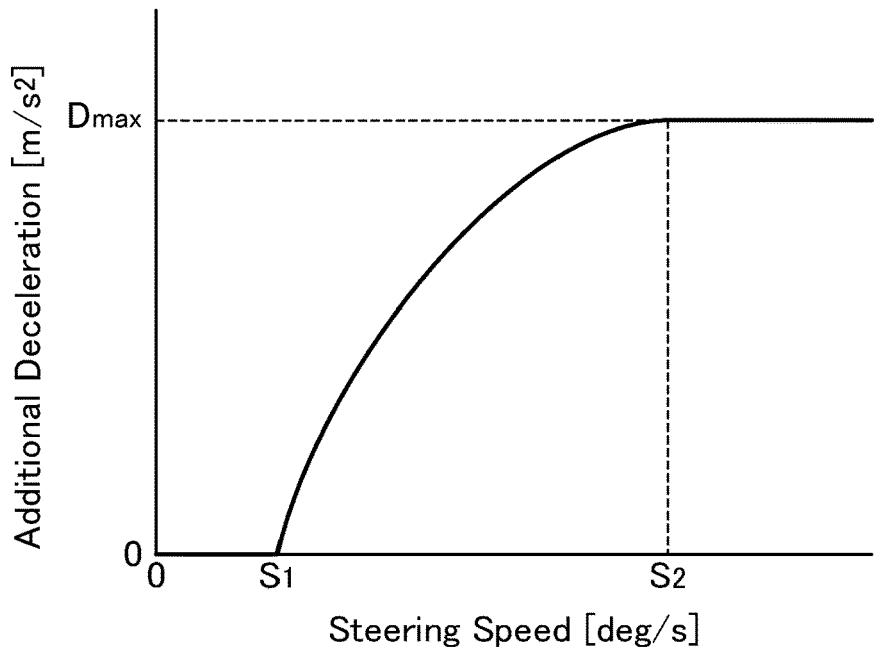
FIG. 5 is a map indicating a relationship between a steering speed and the additional deceleration.
Figure 6:
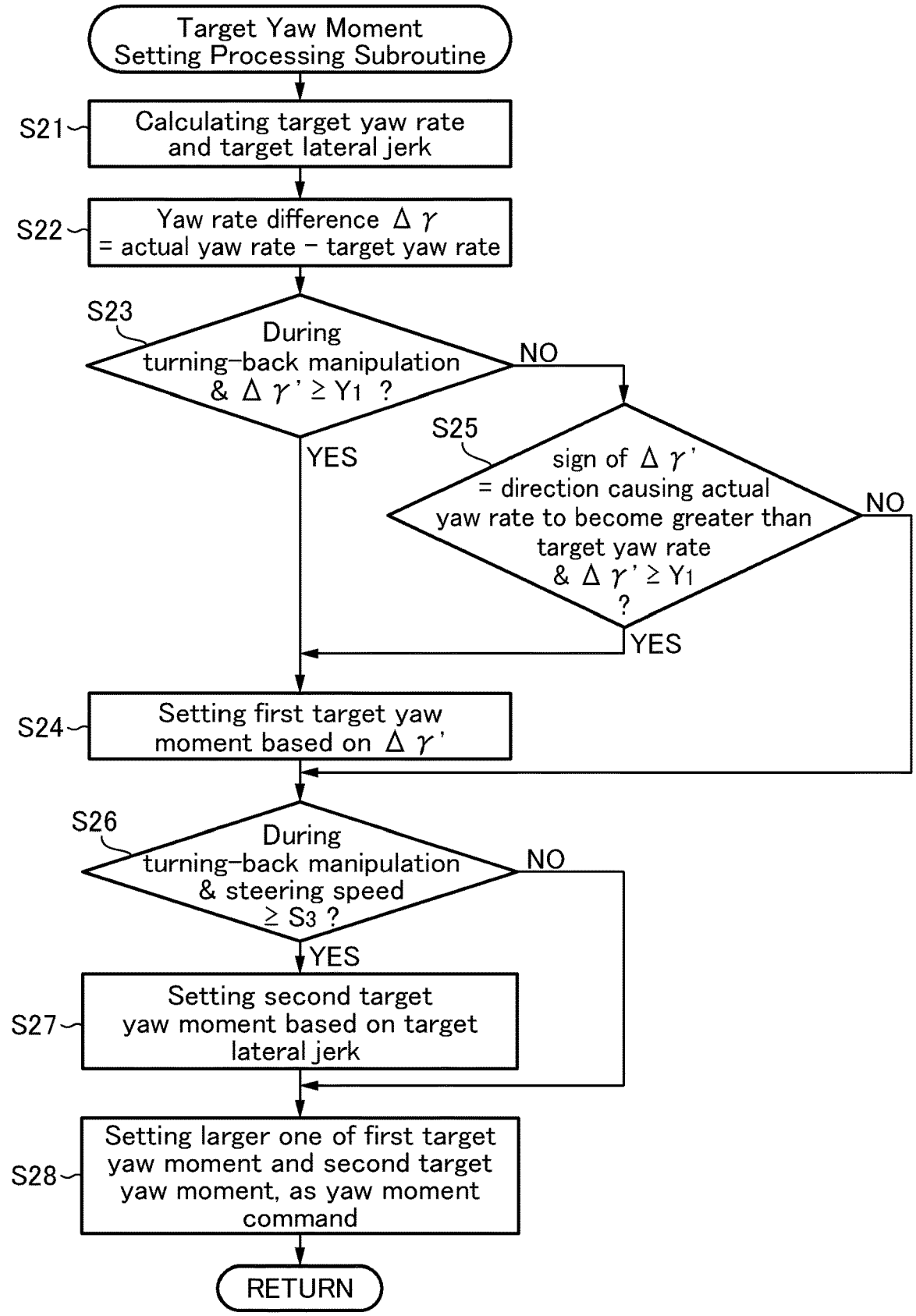
FIG. 6 is a flowchart of a target yaw moment setting processing subroutine through which the vehicle behavior control device according to this embodiment sets a target yaw moment.

FIG. 3 is a flowchart of a behavior control processing routine to be executed by the vehicle behavior control device according to this embodiment, and FIG. 4 is a flowchart of an additional deceleration setting processing subroutine through which the vehicle behavior control device according to this embodiment sets the additional deceleration. FIG. 5 is a map indicating a relationship between a steering speed and the additional deceleration, and FIG. 6 is a flowchart of a target yaw moment setting processing subroutine through which the vehicle behavior control device according to this embodiment sets the target yaw moment. The map depicted in FIG. 5 is preliminarily created and stored in a memory or the like.

The behavior control processing routine depicted in FIG. 3 is activated when an ignition switch of the vehicle 1 is turned on and thus electric power is applied to the vehicle behavior control device, and repeatedly executed with a given period (e.g., 50 ms).

As depicted in FIG. 3, upon start of the behavior control processing routine, the PCM 14 operates, in step S1, to acquire a variety of information of the vehicle 1. Specifically, the PCM 14 operates top acquire detection signals output from the aforementioned various sensors, including the steering angle detected by the steering angle sensor 8, the vehicle speed detected by the vehicle speed sensor 10, and the yaw rate detected by the yaw rate sensor 12.

Subsequently, in step S2, the additional deceleration setting part 20 of the PCM 14 operates to execute the additional deceleration setting processing subroutine to set an additional deceleration to be added to the vehicle 1.

Then, in step S3, the yaw moment setting part 22 of the PCM 14 operates to execute the target yaw moment setting processing subroutine to set a target yaw moment to be added to the vehicle 1.

Subsequently, in step S4, the PCM 14 operates to control an actuator (an electric motor, actuators in a fuel injection system, an ignition system, intake and exhaust systems, etc., of an engine, or the like) to add the additional deceleration set in the step S2, to the vehicle 1 via the drive control system 4. Specifically, the PCM 14 operates to reduce an output torque of the engine or electric motor so as to add the set additional deceleration to the vehicle 1.

Further, in the step S4, the PCM 14 operates to control an actuator (brake pumps or the like) to add the target yaw moment set in the step S3, to the vehicle 1 via the brake control system 18. For example, the PCM 14 preliminarily stores therein a map defining a relationship between the yaw moment command and a rotational speed of each of the brake pumps, and operates to adjust respective braking forces of the road wheels by referring to this map to control the brake pumps such that they operate at respective rotational speeds corresponding to the yaw moment command set through the target yaw moment setting processing subroutine in the step S3, while individually controlling valve units each provided in a fluid pressure supply line connected to a corresponding one of the brake units 16.

After the step S4, the PCM 17 terminates one cycle of the behavior control processing routine.

Next, with reference to FIG. 4, the additional deceleration setting processing subroutine will be described.

As depicted in FIG. 4, upon start of the additional deceleration setting processing subroutine, the additional deceleration setting part 20 of the PCM 14 operates, in step S11, to calculate steering speed based on the steering angle acquired in the step S1 of the behavior control processing routine in FIG. 3.

Subsequently, in step S12, the additional deceleration setting part 20 operates to determine whether a turning manipulation of the steering wheel 6 is being performed (i.e., the steering angle is increasing), and the steering speed is equal to or greater than a given threshold $S_1$.

As a result, when the turning manipulation is being performed and the steering speed is equal to or greater than the threshold $S_1$, the subroutine proceeds to step S13. In the step S13, the additional deceleration setting part 20 operates to set an additional deceleration based on the steering speed. This additional deceleration means a deceleration to be added to the vehicle 1 in response to the steering manipulation, so as to accurately realize vehicle behavior intended by a driver.

Specifically, the additional deceleration setting part 20 operates to set the additional deceleration to a value corresponding to the steering speed calculated in the step S11, based on a relationship between the steering speed and the additional deceleration, indicated by a map depicted in FIG. 5.

In FIG. 5, the horizontal axis represents the steering speed, and the vertical axis represents the additional deceleration. As depicted in FIG. 5, when the steering speed is less than the threshold $S_1$, a corresponding value of the additional deceleration is 0. That is, when the steering speed is less than the threshold $S_1$, the PCM 14 does not perform the control for adding a deceleration to the vehicle 1 based on the steering manipulation (specifically, reduction of the output torque of the engine or electric motor).

On the other hand, when that the steering speed is equal to or greater than the threshold $S_1$, a value of the additional deceleration corresponding to this steering speed gradually comes closer to a given upper limit value $D_{max}$ as the steering speed becomes larger. That is, as the steering speed becomes larger, the additional deceleration gradually increases, and the rate of increase in the additional deceleration gradually decreases. This upper limit value $D_{max}$ is set at a level that a driver does not feel control intervention even when the deceleration is added to the vehicle 1 in response to the steering manipulation (e.g., 0.5 m/s²≈0.05 G)

Further, when the steering speed is equal to or greater than a threshold $S_2$ greater than the threshold $S_1$, the additional deceleration is maintained at the upper limit value $D_{max}$.

After the step S13, the additional deceleration setting part 20 terminates the additional deceleration setting processing subroutine and returns to the main routine.

On the other hand, in the step S12, when the turning manipulation of the steering wheel 6 is not being performed (i.e., the steering angle is constant or is decreasing), or the steering speed is less than the threshold $S_1$, the additional deceleration setting part 20 terminates the additional deceleration setting processing subroutine and returns to the main routine.

In the step S4 of the behavior control processing routine in FIG. 3, the PCM 14 operates to reduce the output torque of the engine or electric motor so as to realize the additional deceleration set through the additional deceleration setting processing subroutine based on the rate of increase in the steering angle via the drive control system 4. In this way, when the turning manipulation of the steering wheel 6 is performed, the output torque of the engine or electric motor can be reduced based on the steering speed during the turning manipulation, so as to increase a vertical load on the front road wheels, so that it is possible to control the behavior of the vehicle 1 with good responsiveness with respect to the turning manipulation by the driver.

Next, with reference to FIG. 6, the target yaw moment setting processing subroutine will be described.

As depicted in FIG. 6, upon start of the target yaw moment setting processing subroutine, the yaw moment setting part 22 of the PCM 14 operates, in step S21, to calculate a target yaw rate and a target lateral jerk, based on the steering angle and the vehicle speed acquired in the step S1 of the behavior control processing routine in FIG. 3.

Specifically, the yaw moment setting part 22 operates to calculate the target yaw rate by multiplying the steering angle by a coefficient according to the vehicle speed. Further, the yaw moment setting part 22 operates to calculate the target lateral jerk by calculating a target lateral acceleration from the target yaw rate and the vehicle speed, and then temporally differentiating the target lateral acceleration.

Subsequently, in step S22, the yaw moment setting part 22 operates to calculate a difference (yaw rate difference) $\Delta\gamma$ by subtracting the target yaw rate calculated in the step S21 from the yaw rate (actual yaw rate) detected by the yaw rate sensor 12 and acquired in the step S1 of the behavior control processing routine in FIG. 3.

Subsequently, in the step S23, the yaw moment setting part 22 operates to determine whether or not the turning-back manipulation of the steering wheel 6 is being performed (i.e., the steering angle is decreasing), and a yaw rate difference change rate $\Delta\gamma'$ obtained by temporally differentiating the yaw rate difference $\Delta\gamma$ is equal to or greater than a given threshold $Y_1$.

As a result, when the turning-back manipulation is being performed and the yaw rate difference change rate $\Delta\gamma'$ is equal to or greater than the threshold $Y_1$, the subroutine proceeds to step S24. In the step S24, the yaw moment setting part 22 operates to set, based on the yaw rate difference change rate $\Delta\gamma$, a yaw moment oriented in a direction opposite to that of the actual yaw rate of the vehicle 1, as a first target yaw moment. Specifically, the yaw moment setting part 22 operates to calculate the magnitude of the first target yaw moment by multiplying the yaw rate difference change rate $\Delta\gamma'$ by a given coefficient $C_{m1}$.

On the other hand, as a result of the determination in the step S23, when the turning-back manipulation of the steering wheel 6 is not being performed (i.e., the steering angle is constant or is increasing), the subroutine proceeds to step S25. In the step S25, the yaw moment setting part 22 operates to determine whether or not the yaw rate difference change rate $\Delta\gamma'$ is changing in a direction causing the actual yaw rate to become greater than the target yaw rate (i.e., in a direction causing the behavior of the vehicle 1 to exhibit an oversteer tendency), and the yaw rate difference change rate $\Delta\gamma'$ is equal to or greater than the threshold $Y_1$. Specifically, when the yaw rate difference is decreasing in a situation where the target yaw rate is equal to or greater than the actual yaw rate, or when the yaw rate difference is increasing in a situation where the target yaw rate is less than the actual yaw rate, the yaw moment setting part 22 operates to determine that the yaw rate difference change rate $\Delta\gamma'$ is changing in the direction causing the actual yaw rate to become greater than the target yaw rate.

As a result, when the yaw rate difference change rate $\Delta\gamma'$ is changing in the direction causing the actual yaw rate to become greater than the target yaw rate, and the yaw rate difference change rate $\Delta\gamma'$ is equal to or greater than the threshold $Y_1$, the subroutine proceeds to the step S24. In the step S24, the yaw moment setting part 22 operates to set, based on the yaw rate difference change rate $\Delta\gamma'$, a yaw moment oriented in a direction opposite to that of the actual yaw rate of the vehicle 1, as the first target yaw moment.

After the step S24, or, as a result of the determination in the step S25, when the yaw rate difference change rate $\Delta\gamma'$ is not changing in the direction causing the actual yaw rate to become greater than the target yaw rate, or the yaw rate difference change rate $\Delta\gamma'$ is less than the threshold $Y_1$, the subroutine proceeds to step S26. In the step S26, the yaw moment setting part 22 operates to determine whether or not the turning-back manipulation of the steering wheel 6 is being performed (i.e., the steering angle is decreasing), and the steering speed is equal to or greater than a given threshold $S_3$.

As a result, when the turning-back manipulation is being performed, and the steering speed is equal to or greater than a given threshold $S_3$, the subroutine proceeds to step S27. In the step S27, the yaw moment setting part 22 operates to set, based on the target lateral jerk calculated in the step S21, a yaw moment oriented in a direction opposite to that of the actual yaw rate of the vehicle 1, as a second target yaw moment.

Specifically, the yaw moment setting part 22 operates to calculate the magnitude of the second target yaw moment by multiplying the target lateral jerk by a given coefficient $C_{m2}$.

After the step S27, or, as a result of the determination in the step S26, when the turning-back manipulation of the steering wheel 6 is not being performed (i.e., the steering angle is constant or is increasing), or the steering speed is less than the given threshold $S_3$, the subroutine proceeds to step S28. In the step S28, the yaw moment setting part 22 operates to set a larger one of the first target yaw moment set in the step S24 and the second target yaw moment set in the step S27, as the yaw moment command.

After the step S28, the yaw moment setting part 22 terminates the target yaw moment setting processing subroutine and returns to the main routine.

Next, with reference to FIGS. 7 and 8, functions of the vehicle behavior control device according to this embodiment will be described.

FIG. 7 depicts time charts indicating temporal changes in various parameters pertaining to behavior control, as measured when the vehicle 1 equipped with the vehicle behavior control device according to this embodiment is driven along a cornering course on a compacted snow road at an approximately constant vehicle speed.

In FIG. 7, the chart (a) indicates a temporal change in the steering angle. As indicated in the chart (a), when the turning manipulation of the steering wheel 6 is performed in a clockwise turning direction of the vehicle 1 (i.e., in a direction causing the vehicle 1 to be turned clockwisely), the steering angle gradually increases in the clockwise turning direction. Then, along with the subsequent turning-back manipulation, the steering angle gradually decreases.

Then, when the turning manipulation of the steering wheel 6 is performed in a counterclockwise turning direction after the steering wheel 6 is temporarily held at a neutral position, the steering angle gradually increases in the counterclockwise turning direction. Then, along with the subsequent turning-back manipulation, the steering angle gradually decreases.

The chart (b) indicates a temporal change in the yaw rate, wherein the dashed line denotes the target yaw rate, and the solid line denotes the actual yaw rate. Further, the chart (c) indicates the yaw rate difference $\Delta\gamma$ between the actual yaw rate and the target yaw rate.

As indicated in the charts (b) and (c), the target yaw rate obtained by multiplying the steering angle by a coefficient according to the vehicle speed changes without delay with respect to the steering angle, whereas the actual yaw rate changes with a slight delay with respect to the target yaw rate. Further, since the vehicle 1 is driven along a cornering course on a compacted snow road having a low-μ surface, a slip angle of the front road wheel 2 is large as compared to the case where the vehicle 1 is driven along a cornering course on a high-μ road.

Thus, as indicated in the charts (b) and (c), as the steering angle gradually increases in the clockwise turning direction due to the turning manipulation of the steering wheel 6 in the clockwise turning direction, the yaw rate difference gradually increases in a direction causing the target yaw rate to become greater than the actual yaw rate. Then, the target yaw rate gradually decreases along with a decrease in the steering angle due to the turning-back manipulation, whereas the actual yaw rate starts to decrease with a slight delay with respect to the target yaw rate. Therefore, the yaw rate difference rapidly decreases, and the actual yaw rate temporarily becomes greater than the target yaw rate. That is, in response to the turning-back manipulation of the steering wheel 6, the yaw rate difference rapidly changes in a direction causing the actual yaw rate to become greater than the target yaw rate.

Then, when the actual yaw rate also starts to decrease, the yaw rate difference is maintained at approximately 0. Then, as the steering angle gradually increases in the counterclockwise turning direction due to the subsequent turning manipulation in the counterclockwise turning direction, the yaw rate difference gradually increases in the direction causing the target yaw rate to become greater than the actual yaw rate again. Then, when the steering angle decreases due to the turning-back manipulation, the target yaw rate immediately starts to decrease, whereas the decrease of the actual yaw rate starts a little late, so that, in response to the turning-back manipulation of the steering wheel 6, the yaw rate difference rapidly changes in the direction causing the actual yaw rate to become greater than the target yaw rate, in the same manner as that during the clockwise turning.

The chart (d) indicates the yaw rate difference change rate. As mentioned above, in both the clockwise turning and the counterclockwise turning, when the turning-back manipulation of the steering wheel 6 is performed, the yaw rate difference rapidly changes in the direction causing the actual yaw rate to become greater than the target yaw rate. That is, as indicated in the chart (d), immediately after start of the turning-back manipulation of the steering wheel 6, the yaw rate difference change rate starts to increase in the direction causing the actual yaw rate to become greater than the target yaw rate.

The chart (e) indicates the target lateral acceleration, and the chart (f) indicates the target lateral jerk.

As indicated in the charts (e) and (f), the target lateral acceleration calculated based on the steering angle changes without delay with respect to the steering angle. Further, when the target lateral acceleration gradually decreases along with a decrease in the steering angle due to the turning-back manipulation of the steering wheel 6, the target lateral jerk gradually increases in a direction opposite to the turning direction of the vehicle 1, according to the rate of decrease in the target lateral acceleration.

The chart (g) indicates a change in the target yaw moment, wherein the solid line denotes the first target yaw moment set based on the yaw rate difference change rate $\Delta\gamma'$, and the dashed line denotes the second target yaw moment set based on the target lateral jerk.

When the vehicle 1 is driven along a cornering course on a compacted snow road having a low-μ surface, the yaw rate difference between the actual yaw rate and the target yaw rate is more likely to become larger, and, particularly during the turning-back manipulation, the yaw rate difference change rate becomes larger, as mentioned above. Thus, as indicated in the chart (g), in both the case where the turning-back manipulation is performed during clockwise turning and the case where the turning-back manipulation is performed during counterclockwise turning, the first target yaw moment set based on the yaw rate difference change rate $\Delta\gamma'$ is greater than the second target yaw moment set based on the target lateral jerk. In this situation, the yaw moment setting part 22 operates to set, as the yaw moment command, the first target yaw moment set based on the yaw rate difference change rate $\Delta\gamma'$.

That is, when the turning-back manipulation of the steering wheel 6 is started, and the yaw rate difference rapidly changes in the direction causing the actual yaw rate to become greater than the target yaw rate, the yaw moment setting part 22 operates to output, to the brake control system 18, a yaw moment command having a direction opposite to that of the actual yaw rate of the vehicle 1 and a magnitude according to the yaw rate difference change rate. Thus, when the turning-back manipulation of the steering wheel 6 is performed on a low-μ road such as a compacted snow road, a yaw moment oriented to suppress turning of the vehicle 1 can be applied to the vehicle 1 immediately in response to a rapid change in the yaw rate difference due to a response delay of the actual yaw rate, so that it is possible to quickly stabilize the vehicle behavior in response to the steering manipulation by the driver.

FIG. 8 depicts time charts indicating temporal changes in various parameters pertaining to behavior control, as measured when the vehicle 1 equipped with the vehicle behavior control device according to this embodiment is driven along a cornering course on a dry asphalt road at an approximately constant vehicle speed.

In FIG. 8, the chart (a) indicates a temporal change in the steering angle. As indicated in the chart (a), when the turning manipulation of the steering wheel 6 is performed in a counterclockwise turning direction of the vehicle 1 (i.e., in a direction causing the vehicle 1 to be turned counterclockwisely), the steering angle gradually increases in the counterclockwise turning direction. Then, along with the subsequent turning-back manipulation, the steering angle gradually decreases.

Then, when the turning manipulation of the steering wheel 6 is performed in a clockwise turning direction after the steering wheel 6 is temporarily held at the neutral position, the steering angle gradually increases in the clockwise turning direction. Then, along with the subsequent turning-back manipulation, the steering angle gradually decreases.

The chart (b) indicates a temporal change in the yaw rate, wherein the dashed line denotes the target yaw rate, and the solid line denotes the actual yaw rate. Further, the chart (c) indicates the yaw rate difference $\Delta\gamma$ between the actual yaw rate and the target yaw rate.

As indicated in the charts (b) and (c), the target yaw rate obtained by multiplying the steering angle by a coefficient according to the vehicle speed changes without delay with respect to the steering angle, whereas the actual yaw rate changes with a slight delay with respect to the target yaw rate. However, since the vehicle 1 is driven along a cornering course on a dry asphalt road having a high-μ surface, a slip angle of the front road wheel 2 is small as compared to the case where the vehicle 1 is driven along a cornering course on a compacted snow road as depicted in FIG. 7.

Thus, as indicated in the charts (b) and (c), as the steering angle gradually increases in the counterclockwise turning direction due to the turning manipulation of the steering wheel 6 in the counterclockwise turning direction, the target yaw rate and the actual yaw rate gradually increase in approximately the same pattern. Then, along with a decrease in the steering angle due to the turning-back manipulation, the target yaw rate and the actual yaw rate gradually decrease in approximately the same pattern. During this process, the yaw rate difference is maintained approximately constant at about 0 without any rapid change.

Subsequently, the steering angle gradually increases along with the turning manipulation in the clockwise direction, and then the steering angle gradually decreases along with the turning-back manipulation. During this process, the yaw rate difference is maintained approximately constant without any rapid change, in the same manner as that during the counterclockwise turning.

The chart (d) indicates the yaw rate difference change rate. As mentioned above, in both the counterclockwise turning and the clockwise turning, the yaw rate difference is maintained approximately constant without any rapid change. That is, as indicated in the chart (d), the yaw rate difference change rate is maintained at a relatively small value in both the counterclockwise turning and the clockwise turning.

The chart (e) indicates the target lateral acceleration, and the chart (f) indicates the target lateral jerk.

As indicated in the charts (e) and (f), the target lateral acceleration calculated based on the steering angle changes without delay with respect to the steering angle. Further, when the target lateral acceleration gradually decreases along with a decrease in the steering angle due to the turning-back manipulation of the steering wheel 6, the target lateral jerk gradually increases in a direction opposite to the turning direction of the vehicle 1, according to the rate of decrease in the target lateral acceleration.

The chart (g) indicates a change in the target yaw moment, wherein the solid line denotes the first target yaw moment set based on the yaw rate difference change rate $\Delta\gamma'$, and the dashed line denotes the second target yaw moment set based on the target lateral jerk.

When the vehicle 1 is driven along a cornering course on a dry asphalt road having a high-μ surface, the yaw rate difference between the actual yaw rate and the target yaw rate is maintained approximately constant at about 0 without any rapid change, as mentioned above, so that the yaw rate difference change rate is maintained at a relatively small value. Thus, as indicated in the chart (g), in both the case where the turning-back manipulation is performed during clockwise turning and the case where the turning-back manipulation is performed during counterclockwise turning, the second target yaw moment set based on the target lateral jerk is greater than the first target yaw moment set based on the yaw rate difference change rate $\Delta\gamma'$. In this situation, the yaw moment setting part 22 operates to set, as the yaw moment command, the second target yaw moment set based on the target lateral jerk.

That is, when the turning-back manipulation of the steering wheel 6 is started, and the target lateral jerk increases according to the rate of decrease in the steering angle due to the turning-back manipulation, the yaw moment setting part 22 operates to output, to the brake control system 18, a yaw moment command having a direction opposite to that of the actual yaw rate of the vehicle 1 and a magnitude according to the target lateral jerk. Thus, when the turning-back manipulation of the steering wheel 6 is performed on a high-μ road such as a dry asphalt road, a yaw moment oriented to suppress turning of the vehicle 1 can be applied to the vehicle 1 immediately in response to a rise of the target lateral jerk due to a decrease in the steering angle, so that it is possible to quickly stabilize the vehicle behavior in response to the steering manipulation by the driver.

Next, some modifications of the above embodiment will be described.

The above embodiment has been described based on an example where the rotational angle of the steering shaft coupled to the steering wheel 6 is used as the steering angle. Alternatively, in place of or in combination with the rotational angle of the steering shaft, any of various state quantities (such as a rotational angle of a motor for adding an assist torque, or a displacement of a rack of a rack-and-pinion mechanism) in a steering system may be used.

The above embodiment has been described based on an example where the additional deceleration setting part 20 is configured to set the additional deceleration based on the steering speed. Alternatively, the additional deceleration setting part 20 may be configured to set the additional deceleration based on the target lateral jerk calculated based on the steering angle and the vehicle speed, or a lateral jerk calculated based on a lateral acceleration detected by a non-depicted acceleration sensor.

The above embodiment has been described based on an example where the yaw moment setting part 22 is configured to calculate, as the second target yaw moment, a yaw moment oriented in a direction opposite to that of the actual yaw rate of the vehicle by multiplying the target lateral jerk by a given coefficient. Alternatively, the yaw moment setting part 22 may be configured to calculate the second target yaw moment by multiplying the steering speed by a given coefficient.

Next, advantageous effects of the vehicle behavior control device according to the above embodiment and the modifications of the embodiment will be described.

First of all, the yaw moment setting part 22 is operable to decide a target yaw rate of the vehicle 1, based on the steering angle and the vehicle speed, and set, based on a change rate of a difference between the actual yaw rate and the target yaw rate, a yaw moment oriented in a direction opposite to that of the actual yaw rate of the vehicle 1, as a first target yaw moment. Thus, for example, when the steering wheel 6 is manipulated on a low-μ road such as a compacted snow road, a yaw moment oriented to suppress turning of the vehicle 1 can be applied to the vehicle 1 immediately in response to a rapid change in the yaw rate difference due to a response delay of the actual yaw rate, so that it is possible to quickly stabilize the behavior of the vehicle 1 in response to the steering manipulation by the driver, before the vehicle behavior becomes unstable. This makes it possible to improve responsiveness and linear feeling of the vehicle behavior with respect to the steering manipulation, and stabilize the vehicle attitude to enhance a feeling of safety.

Further, when the change rate of the yaw rate difference between the actual yaw rate and the target yaw rate becomes larger due to a response delay of the vehicle behavior with respect to a rapid steering manipulation, e.g., on a low-μ road such as a compacted snow road, the yaw moment setting part 22 is operable to set the first target moment to a larger value. Thus, a yaw moment oriented to suppress turning of the vehicle 1 can be applied to the vehicle 1 more strongly as the response delay of the vehicle behavior with respect to the steering manipulation becomes larger, so that it is possible to quickly stabilize the vehicle behavior in response to the steering manipulation by the driver.

Further, the yaw moment setting part 22 is operable, when a turning-back manipulation of the steering wheel 6 is being performed, and the change rate of the difference between the actual yaw rate and the target yaw rate is equal to or greater than a given value, to set the first target yaw moment oriented to suppress turning of the vehicle 1. Thus, when the yaw rate difference rapidly changes due to a follow-up delay of the vehicle behavior with respect to the turning-back manipulation of the steering wheel 6, e.g., in a situation where the turning-back manipulation is being performed on a low-μ road such as a compacted snow road, a yaw moment oriented to suppress turning of the vehicle can be applied to the vehicle immediately in response to the rapid change in the yaw rate difference. This makes it possible to quickly stabilize the behavior of the vehicle 1 in response to the steering manipulation by the driver, before the vehicle behavior becomes unstable.

Further, the yaw moment setting part 22 is operable, when the yaw rate difference is changing in a direction causing the behavior of the vehicle 1 to exhibit oversteer tendency, to set the first target yaw moment oriented to suppress turning of the vehicle. Thus, when the yaw rate difference changes in the direction causing the vehicle behavior to exhibit oversteer tendency due to a follow-up delay of the vehicle behavior with respect to the turning-back manipulation of the steering wheel 6, e.g., in a situation where the turning-back manipulation is being performed on a low-μ road such as a compacted snow road, a yaw moment oriented to suppress turning of the vehicle 1 can be applied to the vehicle 1 immediately in response to the rapid change in the yaw rate difference. This makes it possible to quickly stabilize the behavior of the vehicle 1 in response to the steering manipulation by the driver, before the vehicle behavior becomes unstable.

Further, the yaw moment setting part 22 is operable, when the turning-back manipulation of the steering wheel 6 is being performed, to set, based on the rate of the decrease in the steering angle, a yaw moment oriented to suppress turning of the vehicle 1, as a second target yaw moment. Thus, a yaw moment having a magnitude based on the speed of the turning-back manipulation by the driver can be applied to the vehicle 1 in a direction enabling the yaw moment to suppress turning of the vehicle 1, so that it is possible to quickly stabilize the vehicle behavior during the turning-back manipulation. This makes it possible to improve the responsiveness and linear feeling of the vehicle behavior with respect to the steering manipulation, and stabilize the vehicle attitude to enhance the feeling of safety.

Further, the yaw moment setting part 22 is operable to set a larger one of the first target yaw moment and the second target yaw moment, as a yaw moment command, and output the yaw moment command to the brake control system 18. Thus, for example, in a situation where the vehicle is traveling on a low-μ road such as a compacted snow road at a low vehicle speed, and the difference between the actual yaw rate and the target yaw rate is more likely to rapidly change due to the response delay of the vehicle behavior, the first target yaw moment oriented to suppress turning of the vehicle 1 can be applied to the vehicle 1 immediately in response to the rapid change in the yaw rate difference, whereas, for example, in a situation where the vehicle is traveling on a high-μ road such as a dry asphalt road, and the difference between the actual yaw rate and the target yaw rate is less likely to occur, the second target yaw moment oriented to suppress turning of the vehicle 1 can be applied to the vehicle 1, based on the speed of the turning-back manipulation by the driver. This makes it possible to improve the responsiveness and linear feeling of the vehicle behavior with respect to the steering manipulation and stabilize the vehicle attitude to enhance the feeling of safety, under various traveling conditions.

Further, the yaw moment setting part 22 is operable, when the turning manipulation of the steering wheel 6, to reduce the output torque of the engine or electric motor so as to attain the additional deceleration set based on the rate of the increase in the steering angle. Thus, when the turning manipulation is performed, a vertical load on the front road wheels 2 can be increased by reducing the output torque based on the steering speed during the turning manipulation, to control the behavior of the vehicle 1 with a good responsiveness with respect to the turning manipulation by the driver. This makes it possible to improve the responsiveness and linear feeling of the vehicle behavior with respect to the steering manipulation, without giving the driver a strong feeling of control intervention.

What is claimed is:

1. A vehicle behavior control device comprising:
   a braking device configured to apply different braking forces, respectively, to right and left road wheels of a vehicle;
   a steering wheel configured to be manipulated by a driver;
   a steering angle sensor configured to detect a steering angle of the steering wheel;
   a vehicle speed sensor configured to detect a vehicle speed of the vehicle;
   a yaw rate sensor configured to detect an actual yaw rate of the vehicle; and
   a processor configured to control the braking device,
   wherein the processor is configured to:
   decide a target yaw rate of the vehicle, based on the steering angle and the vehicle speed;
   set, when a turning-back manipulation of the steering wheel is being performed, a yaw moment oriented in a direction opposite to that of the actual yaw rate of the vehicle, as a first target yaw moment to be applied to the vehicle, based on a change rate of a difference between the actual yaw rate and the target yaw rate;
   set, when the turning-back manipulation of the steering wheel is being performed, a yaw moment oriented in a direction opposite to that of the actual yaw rate of the vehicle, as a second target yaw moment to be applied to the vehicle, based on a rate of the decrease in the steering angle; and
   control the braking device to apply one of the first and second target yaw moments to the vehicle.

2. The vehicle behavior control device according to claim 1, wherein the processor is configured to set the first target yaw moment to a larger value as the change rate of the difference between the actual yaw rate and the target yaw rate becomes larger.

3. The vehicle behavior control device according to claim 1, wherein, when the change rate of the difference between the actual yaw rate and the target yaw rate is equal to or greater than a given value, the processor is configured to set the first target yaw moment.

4. The vehicle behavior control device according to claim 1, wherein, when the difference between the actual yaw rate and the target yaw rate is changing in a direction causing the actual yaw rate to become greater than the target yaw rate, the processor is configured to set the first target yaw moment.

5. The vehicle behavior control device according to claim 1, wherein the processor is configured to control the braking device to apply a larger one of the first target yaw moment and the second target yaw moment to the vehicle.

6. The vehicle behavior control device according to claim 1, further comprising a power source configured to output a torque for driving road wheels of the vehicle, wherein, when a turning manipulation of the steering wheel is being performed, the processor is configured to set an additional deceleration to be added to the vehicle, based on a rate of the increase in the steering angle, and to reduce the output torque of the power source so as to attain the additional deceleration.

7. The vehicle behavior control device according to claim 1, wherein the processor is configured to:

calculate the difference between the actual yaw rate detected by the yaw rate sensor and the target yaw rate decided based on the steering angle and the vehicle speed;

determine whether or not the turning-back manipulation of the steering wheel is being performed and the change rate of the difference between the actual yaw rate and the target yaw rate is equal to or greater than a first threshold;

set the first target yaw moment to a yaw moment command, when it is determined that the turning-back manipulation of the steering wheel is being performed and the change rate of the difference between the actual yaw rate and the target yaw rate is equal to or greater than the first threshold; and control the braking device based on the yaw moment command.

8. The vehicle behavior control device according to claim 1, wherein the processor is configured to:

set the second target yaw moment to a yaw moment command, when it is determined that the turning-back manipulation of the steering wheel is being performed and a steering speed which is a change rate of the steering angle is equal to or greater than a second threshold;

set a larger one of the first and second target yaw moments to the yaw moment command, when it is determined that the turning-back manipulation of the steering wheel is not being performed, or the steering speed is less than the second threshold; and control the braking device based on the yaw moment command.

9. The vehicle behavior control device according to claim 7, wherein the processor is configured to:

set the second target yaw moment to a yaw moment command, when it is determined that the change rate of the difference between the actual yaw rate and the target yaw rate is equal to or greater than the first threshold, and that the turning-back manipulation of the steering wheel is being performed, and that a steering speed which is a change rate of the steering angle is equal to or greater than a second threshold;

set a larger one of the first and second target yaw moments to the yaw moment command, when it is determined that the turning-back manipulation of the steering wheel is not being performed, or the steering speed is less than the second threshold; and control the braking device based on the yaw moment command.

10. A vehicle behavior control device comprising:

a power source configured to output a torque for driving road wheels of a vehicle;

a braking device configured to apply different braking forces, respectively, to right and left road wheels of the vehicle;

a steering wheel configured to be manipulated by a driver;

a steering angle sensor configured to detect a steering angle of the steering wheel;

a vehicle speed sensor configured to detect a vehicle speed of the vehicle;

a yaw rate sensor configured to detect an actual yaw rate of the vehicle; and a processor configured to control the power source and the braking device, wherein the processor is configured to:

set an additional deceleration to be added to the vehicle, to a value of 0.05 G or less, according to a steering speed which is a change rate of the steering angle, or a lateral jerk obtained based on a lateral acceleration of the vehicle, when a turning manipulation of the steering wheel is being performed and the steering angle detected by the steering angle sensor is increasing;

reduce the output torque of the power source so as to generate the additional deceleration;

decide a target yaw rate of the vehicle based on the steering angle and the vehicle speed;

set, when a turning-back manipulation of the steering wheel is being performed and the steering angle detected by the steering angle sensor is decreasing, a yaw moment oriented in a direction opposite to that of the actual yaw rate of the vehicle, as a first target yaw moment, based on a change rate of a difference between the actual yaw rate and the target yaw rate;

set, when the turning-back manipulation of the steering wheel is being performed and the steering angle detected by the steering angle sensor is decreasing, another yaw moment oriented in a direction opposite to that of the actual yaw rate of the vehicle, as a second target yaw moment, based on the lateral jerk or the steering angle; and control the braking device to apply a larger one of the first target yaw moment and the second target yaw moment to the vehicle.

* * * * *